United States Patent [19]

Michael

[11] 4,106,797
[45] Aug. 15, 1978

[54] REINFORCED FITTING CONSTRUCTION

[75] Inventor: Vesta F. Michael, Big Spring, Tex.

[73] Assignee: Fiber Glass Systems, Inc., Big Spring, Tex.

[21] Appl. No.: 684,097

[22] Filed: May 7, 1976

[51] Int. Cl.² .................. F16L 41/00; B65H 81/00
[52] U.S. Cl. .................................. 285/156; 29/157 T; 156/173; 285/423; 285/DIG. 20
[58] Field of Search .............. 156/173, 172, 191, 195, 156/187, 188, 189, 242, 293, 294; 285/DIG. 20, 423, 156; 138/132, 129, 133, 135, 137, 138, 141, 142, 144, 147, 153, 174, 175, DIG. 2; 264/273; 242/7.21, 7.22, 7.3, 7.02; 29/455 R, 455 L, 455 M, 469, 157 R, 157 T, 423; 251/358, 366, 367, 368; 428/35, 36

[56] References Cited

U.S. PATENT DOCUMENTS

| | | | |
|---|---|---|---|
| 1,696,725 | 12/1928 | Murray | 138/150 |
| 2,878,038 | 3/1959 | Noland | 156/172 |
| 3,212,664 | 10/1965 | Wagle | 220/3 |
| 3,232,637 | 2/1966 | Pennington et al. | 138/175 |
| 3,526,386 | 9/1970 | Gachot | 251/366 |
| 3,623,930 | 11/1971 | Grash | 156/173 |
| 3,700,764 | 10/1972 | Tago | 264/273 |
| 3,765,979 | 10/1973 | Thomas | 156/173 |
| 3,860,043 | 1/1975 | Kutnyak et al. | 138/153 |

FOREIGN PATENT DOCUMENTS 1,000,375  8/1965  United Kingdom ............. 156/172

*Primary Examiner*—William A. Powell
*Assistant Examiner*—Michael W. Ball
*Attorney, Agent, or Firm*—Neuman, Williams, Anderson & Olson

[57] ABSTRACT

In forming a reinforced fitting, an inner shell is first formed of alternate layers of glass filaments arranged transversely and parallel to the central axis of the tubular fitting portion of which comprising a part; the filaments are embedded in a matrix of cured resin such as epoxy resin. A rigid reinforcing metal cage is welded over the inner shell and a curable resin paste is applied to the outer surface of the cage so as to fill in all interstices between the cage and inner shell as well as interstices between the cage portions so as to form a substantially smooth outer surface in the partially-formed body with no voids therein. Additional resin-saturated glass filaments are then disposed over the smooth shell outer surface in a substantially uniform manner to provide a fitting construction of desired dimensions. The final fitting of desired dimensions is then subjected to desired curing procedures to assure desired resin hardening without effecting separation of the metal cage from the glass-resin matrix.

In the course of forming the inner shell, female threads may be integrally formed on at least one tubular end portion. The resulting reinforced fitting construction is of great strength; being resistant to great internal pressures, external collapse forces, tensile, shear and torsion forces.

10 Claims, 10 Drawing Figures

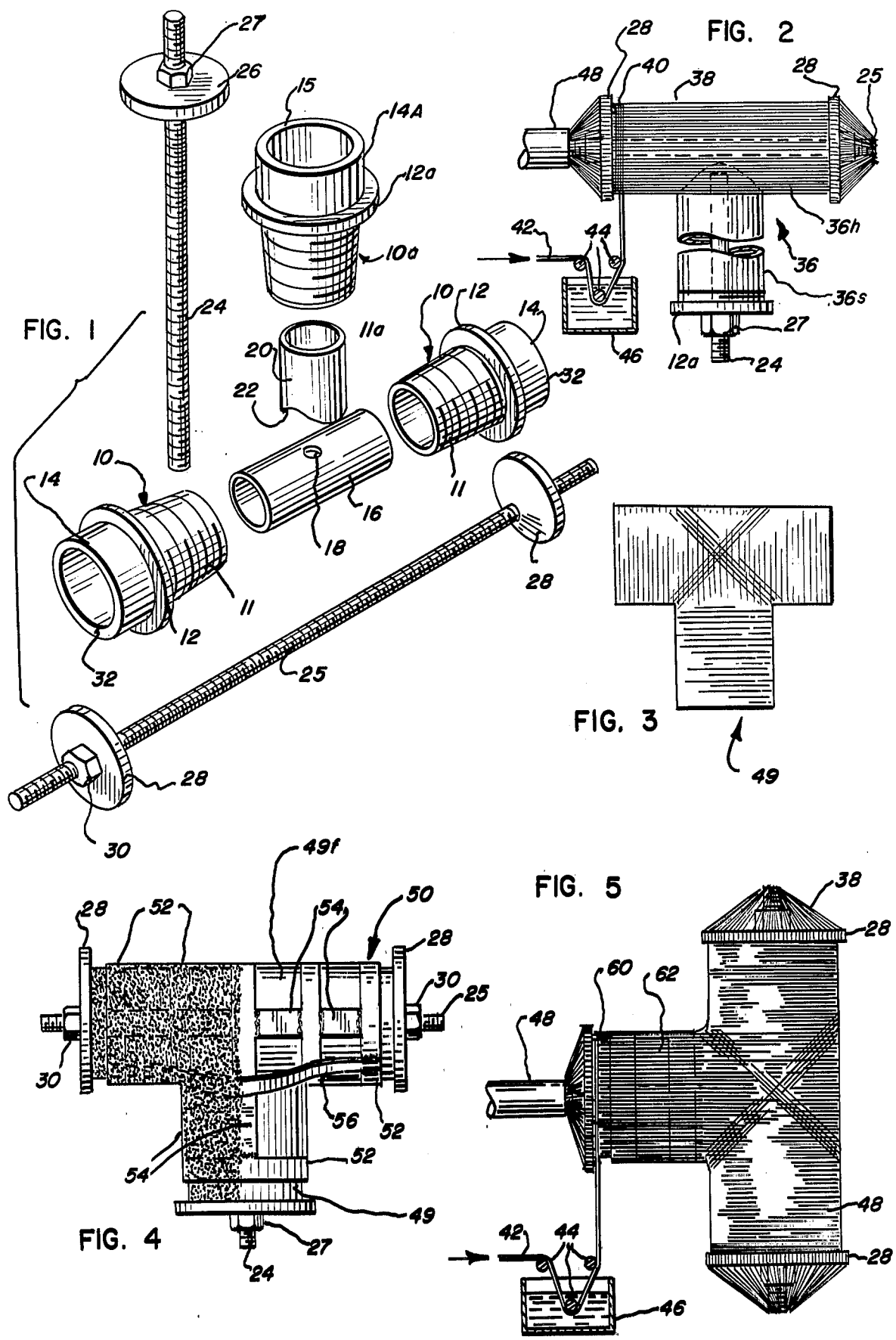

FIG. 6
FIG. 7
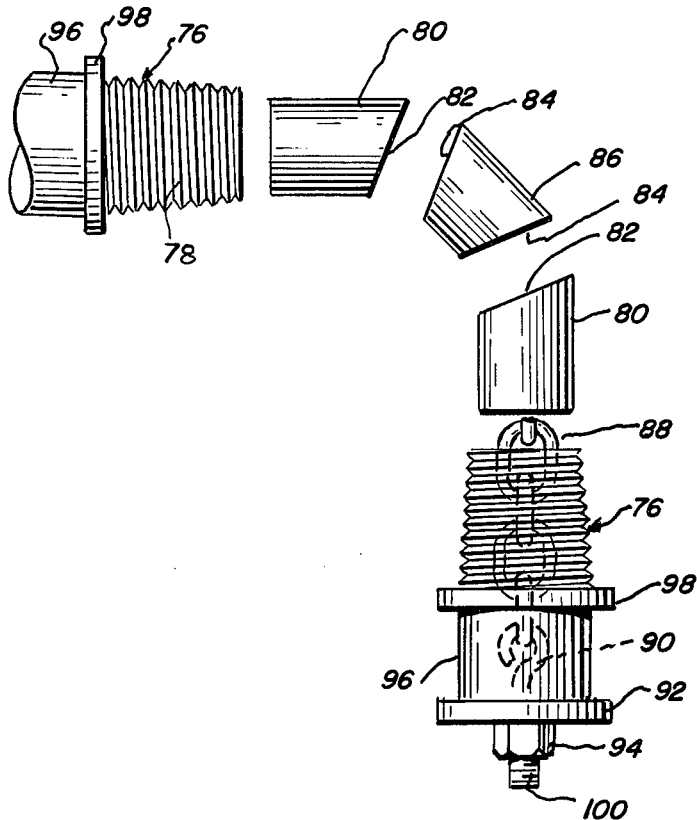
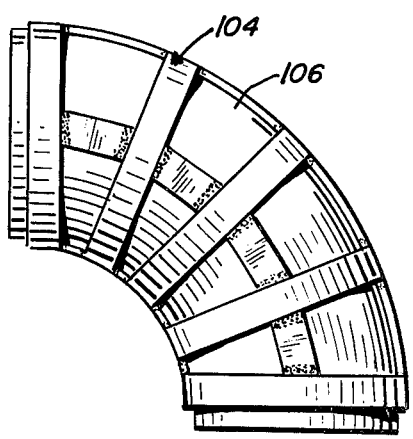
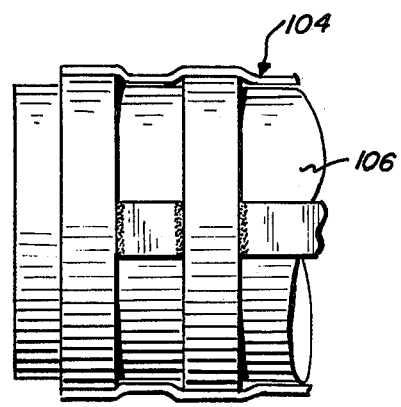
FIG. 8
FIG. 10
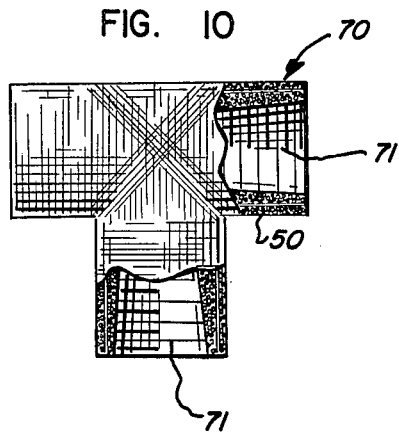
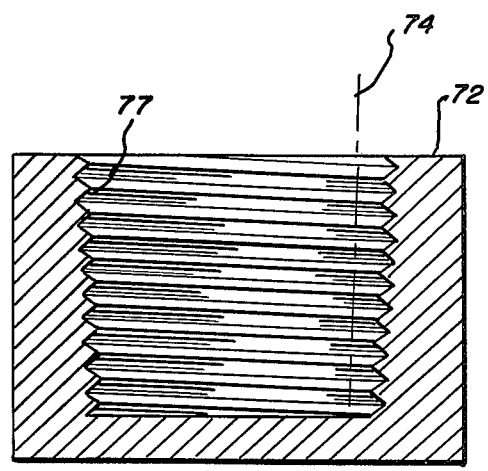
FIG. 9

REINFORCED FITTING CONSTRUCTION

BACKGROUND OF THE INVENTION

This invention relates to a reinforced fitting construction and, more particularly, pertains to a fitting body of cured resin and reinforcing glass filaments having embedded therein a reinforcing rigid cage of metal straps. The provided fitting construction possesses excellent corrosion resistance and strength, enabling the same to be particularly adapted for use in industries where corrosive conditions are encountered such as in the oil and chemical industries.

The art relating to fitting manufacture is cognizant of the desirability of fabricating fittings of corrosion-resistant materials such as glass filaments and cured resins as disclosed in patents such as Thomas U.S. Pat. No. 3,765,979 granted Oct. 16, 1973. Similarly, the prior art is aware of the desirability of employing encircling metal reinforcements over fittings and the like as evidenced by teachings such as Murray U.S. Pat. No. 1,696,725 granted Dec. 25, 1928 which discloses fittings having metal reinforcements secured about the exterior surfaces thereof. However, there is nowhere shown or suggested in the prior art the desirability of employing a glass reinforced resin fitting of superior corrosion resistance having embedded therein a reinforcing metal cage which imparts superior strength to the fitting having the same disposed thereover. Since fittings comprise tubular portions arranged along intersecting axes, intersecting forces are normally exerted on such tubular portions in the normal course of fitting use. Such forces necessitate an ability of the fitting body to resist shear, tensile and torsion forces if failure is to be avoided.

It is an object of this invention, therefore, to provide a fitting construction of superior corrosion resistance and strength heretofore unattainable by fittings of the prior art.

It is another object of this invention to provide a method of fitting manufacture in which a steel reinforcing cage is intimately united to and locked within an encapsulating glass-resin matrix. The cage is embedded in and mechanically locked to the matrix in the absence of voids in the fitting body, which voids give rise to areas of weakness.

It is a further object of this invention to provide a novel fitting construction in which the threads formed therein are of exceptional strength by virtue of their location adjacent a steel reinforcement and resulting exceptional resistance to shear forces.

It is still a further object of this invention to provide a novel fitting construction comprising a minimum number of materials of fabrication which may be efficiently manufactured on a commercial basis.

It is yet another object of this invention to provide a method of forming fitting constructions which comprises a minimum number of basic process steps and manufacturing apparatus of relatively simple design.

SUMMARY OF THE INVENTION

In one embodiment of the provided invention a glass reinforced, resin T member is formed having a reinforcing steel cage embedded therein. Such a T construction, which may comprise a main branch and a stem disposed at right angles thereto, is fabricated by initially forming a reinforced resin shell over a multi-part mandrel assembly. The mandrel comprises a plurality of separable elements including spaced apart threaded form members adapted to function as molds for female threads in the T member which is fabricated; the mold portions are spaced apart by means of an interconnecting tubular portion or portions. The interposed tubular portion of the T main branch is centrally apertured and engages a saddle member and distal female threaded mold portion which serve to define the form about which the stem of the T to be formed will be shaped.

The separable components of the mandrel are maintained in a state of assembly by means of tie rods and opposed abutment or end plates and locking nuts which urge endwise pressure against the opposed end limits of the multi-part mandrel assembly so as to maintain the same in a state of rigid assembly. The assembled mold defining a T member is coated with a parting agent such as paraffin wax applied to the surface thereof after which a hardenable epoxy resin coating is applied over said paraffin coating, and alternate layers of untwisted glass roving filaments arranged transversely and longitudinally of the tubular T portions are applied. The glass filaments are saturated with hardenable epoxy resin until an initial shell of desired thickness is formed. The shell is then heat cured and the surface of the initial shell ground smooth so as to remove any sheen surface imperfections therefrom. A steel reinforcing cage composed of annular steel rings and interconnecting straps is then welded about the main branch and stem of the initial T shell. Following the welding operation, the surface of the resulting T member is cleansed with an organic solvent to remove any dirt. The resulting cleaned T member comprising an initial glass reinforced resin shell and an overlying steel reinforcing cage then has a moldable, hardenable epoxy resin paste applied thereto so as to fill any interstices between the steel cage and the shell disposed therebeneath so as to form a substantially smooth outer surface free of any air pockets or gaps. By passing between the cage interstices defined by the connected straps, the resin, when hardened, forms a mechanical lock securing the cage to the resin body.

Strands of glass filaments are then arranged in alternate layers parallel to and transversely to the tubular portions of the T member until a T of desired final dimensions has been built up. The resulting T member in which the reinforcing cage is completely hidden from view is then cured at slightly above room temperature and subsequently cured at a desired elevated curing temperature to harden the resin. Thus, a corrosion-resistant, glass-reinforced, epoxy resin fitting is formed of excellent strength and corrosion resistance in which the reinforcing steel cage is disposed within the T body and hidden from view. The cage imparts to the resulting T construction exceptional strength characteristics, enabling such T to resist all manner of forces both internally and externally applied.

The foregoing method is equally applicable to the formation of fittings other than T's such as Y's, 45° and 90° elbows, etc. The manner of fabrication is substantially the same as above described with the exception that the mandrel configuration is changed to accommodate the shape of the desired fitting to be formed.

For a more complete understanding of this invention, reference will now be made to the drawings wherein.

FIG. 1 is an exploded view of separable mandrel elements which may be employed for purposes of forming a T member made in accordance with the teachings of this invention;

FIG. 2 is an elevational view illustrating a T member in the initial stages of formation, formed about the assembled mandrel components of FIG. 1 of the drawing;

FIG. 3 is an elevational view partly in section illustrating a T member shell comprising a first stage in the formation of a fitting member made pursuant to this invention;

FIG. 4 illustrates the preliminary shell construction of FIG. 3 after a reinforcing steel cage has been welded thereabout. The construction of FIG. 4 comprises an intermediate stage in the production of a fitting member made in accordance with this invention;

FIG. 5 comprises an elevational view, partly in section, illustrating the steel reinforced shell of FIG. 4 after a portion of the final glass reinforced epoxy resin shell has been formed thereabout;

FIG. 6 is a figure similar to FIG. 1 illustrating separable mandrel elements which may be employed for purposes of forming a 90° elbow in accordance with the teachings of this invention;

FIG. 7 is a view similar to FIG. 4 illustrating a steel reinforcing cage formed about an initial elbow shell which has been formed about the mandrel elements of FIG. 6;

FIG. 8 is a fragmentary elevational view illustrated on an enlarged scale showing the close contact between the welded metal cage and the underlying glass reinforced resin shell about which formed;

FIG. 9 is a sectional view of a mold member which may be employed for purposes of forming male threads on the end of a fitting member made in accordance with the teachings of this invention; and FIG. 10 is an elevational view, partly in section, of a completed T made in accordance with this invention.

Referring now more particularly to FIG. 1 a plurality of mandrel elements are illustrated in a state of disassembly. Such elements comprise opposed female thread forms 10 which comprise threaded nipples having annular flange portions 12 interposed the female thread mold portions 11 and tubular portions 14, the latter being present to facilitate assembly of the various mandrel components and disassembly thereof following fitting formation thereabout. The opposed forms 10 are adapted to telescopically receive or abut in an edge-to-edge relationship opposed end portions of a central tubular mandrel portion 16. Tubular portion 16 has a central tapped aperture 18. In a state of assembly the portions 11, in combination with the central tubular portion 16, define a form about which the main branch of a T member may be formed.

The stem portion of the T member is formed about the mandrel elements of FIG. 1 comprising tubular portion 20 which is arcuately cut at its lower portion as illustrated in FIG. 1 at 22 so as to form a saddle configuration which is fully seated about the peripheral portion of the tubular portion 16 of the mandrel components disposed about the central aperture 18. The opposed terminal portion of the stem portion of the T mandrel comprises a form 10a which is substantially the same as the forms 10, the corresponding threaded flange and tubular portions bearing the same numerals with the suffix "a".

In the normal course of assembling the multi-part mandrel of FIG. 1, the stem elements 10a and 20 are butted end to end and the saddle 22 of tubular portion 20 is positioned centrally about the aperture 18. The lower distal end of threaded rod 24 may then threadedly engage aperture 18 and pressure plate 26 mounted on the opposed distal end portion of the rod 24 may be urged against distal edge 15 of the mandrel element 14a by means of locking nut 27 until the elements 16, 20 and 10a are in a rigid state of assembly.

As an alternative to threadedly engaging the end of rod 24 in the tapped aperture 18, rod 24 may engage a nut member (not illustrated) disposed in the interior of the central tubular portion 16 of the main arm of the T member.

The elements 10 and 16 may be urged into a rigid state of assembly by means of tie rod 25, opposed pressure plates 28 and locking nuts 30, (only one geing seen in FIG. 1) which urge the pressure plates 28 against opposed end edges 32 of the tubular portions 14 of the elements 10 until the interposed mandrel elements are in desired abutting relation.

FIG. 2 illustrates the separable elements of FIG. 1 in a state of assembly and ready for formation of a glass reinforced resin fitting thereabout in which a metal-reinforcing cage is to be embedded in a central body portion thereof. The use of glass reinforcements in resin bodies is well known and described in may earlier patents such as U.S. Pat. Nos. 3,202,560; 3,291,881 and 3,381,715 granted Aug. 24, 1965, Dec. 13, 1966 and May 7, 1968 respectively. I prefer to use untwisted glass reinforcements in the formation of my improved fitting construction inasmuch as the tensile strength of glass filaments is extremely high, glass fibers having tensile strengths of between 250,000 to 400,000 psi. I also prefer to use epoxy resin in the body construction of the fitting hereinafter described in some detail, the epoxy resin being hardened by a polyfunctional amine. The glass reinforcements by way of example may comprise glass roving made up of glass filaments 0.00037 inch or 0.00051 inch in diameter formed from lime aluminum borosilicate glass and coated with a high tensile strength sizing agent. The sizing tends to eliminate abrading of the filaments against each other in the course of manufacture and also assists in effecting a stronger bond with the epoxy resin. A most satisfactory resin composition comprises twelve parts of epoxy resin to one part of hardener comprising triethylenetetramine, such suggested composition being given by way of example only and not limitation in carrying out the process hereinafter described.

In the course of preparing a glass reinforced epoxy resin shell in accordance with this invention, a parting agent such as paraffin wax is first coated over the exterior mandrel surface defined by the separable components of FIG. 1 illustrated in a state of assembly in FIG. 2. The parting layer prevents adherence of the mandrel to the epoxy resin of the T body to be effected and is readily melted during subsequent heat curing of the formed T for easy separation of the mandrel components. The coated, assembled mandrel 36 has formed thereover alternate layers of longitudinally and transversely arranged glass roving embedded in an epoxy resin matrix until an initial shell of the desired thickness is formed. It is preferred that the first layer of glass roving applied about the mandrel comprise longitudinal roving or filaments so as to eliminate defects on the interior periphery of the finished fitting product as may be caused by spiral windings pulling through. It may be desirable for purposes of ensuring a smooth inner T surface, to initially coat the exterior waxed surface of the mandrel assembly 36 wich a hardenable epoxy resin coating which is subsequently cured so as to assure an innermost smooth surface free of any roving protrusion into the interior periphery of the fitting member.

FIG. 2 illustrates mandrel 36 employed in the initial stage of fitting formation wherein a longitudinal "sock" or "skirt" 38 of glass roving has been applied about the periphery of main horizontal branch 36h of the illustrated mandrel and tied down at opposed ends to end portions of tie rod 25. The filaments of sock 38 are then locked securely to the periphery of the main horizontal arm of the illustrated mandrel 36 by means of a spiral glass filament layer 40 illustrated in the initial stages of being wound about the length of the horizontal main branch 36h of the illustrated mandrel. It will be noted that glass roving 42 employed in the formation of the spiral winding 40 originates with a spool or other source not illustrated, and is guided by means of guide rollers 44 into a bath of a hardenable epoxy resin composition disposed in container 46. Similarly, the horizontal sock 38 illustrated in position on the horizontal arm 36h of the illustrated mandrel is coated with a hardenable epoxy resin composition after being affixed in place in the manner illustrated in FIG. 2. The spiral filaments as well as the longitudinal socks of filaments are applied tautly to utilize fully the inherent tensile strength of the glass filaments.

In the course of being wound on the main branch 36h of mandrel 36, the latter assembly is rotated by means of a driving chuck 48, fragmentarily illustrated, which is in turn driven by a lathe, motor output shaft or other source of rotary driving force. The assembly may be similarly rotated when applying a hardenable epoxy liquid to the horizontal sock 38 after the latter is fixed in place on the mandrel to assure saturation thereof. When the stem portion 36s of the mandrel is reached, the spiral roving layer 40 will be forced to deviate from a purely transverse arrangement and assume a more angular disposition so as to cover the mandrel portion of the horizontal arm 36h oppositely disposed to the stem portion 36s of the mandrel assembly. In addition, glass reinforcements transverse to the axis of main branch 36h of the mandrel may be applied over the branch portion on which the stem mandrel assembly is mounted by means of a longitudinal "sock" or "skirt" folded about the central portion of branch 36 and arranged around the portions of the stem 36s in alignment therewith.

The horizontal and spiral layers of resin-saturated glass roving are similarly applied to the mandrel stem portion 36s as above described with respect to mandrel portion 36h. The procedure is repeated until the desired number of horizontal socks and transverse roving layers have been applied for purposes of effecting a desired initial shell thickness. Whereas the initial roving layer applied to the mandrel is preferably a longitudinal roving layer, the final shell layer is preferably a locking spiral so as to minimize the possibility of longitudinal strands being pulled from an interior fitting portion. The initial shell of epoxy resin reinforced with glass roving is set at a temperature slightly above room temperature and then heat cured at a desired elevated temperature in a curing oven until desired hardness is indicated by touching the exterior surface with a spatula or the like. By way of example, the initial set may be effected at a temperature of 80° F to 100° F and the subsequent cure effected at a temperature of about 250° F for ½ to 1 hour.

Resulting hardened shell 49 of FIG. 3 is then surface ground and cleaned so as to eliminate any shiny, slippery surface, which surface would be detrimental to integral formation with subsequent application or additional horizontal socks and transverse roving spirals saturated in epoxy resin. Following the surface grinding operation, such as may be carried out with an abrasive disc or the like, an integral, rigid reinforcing cage is welded about the periphery of the initial fitting shell as illustrated in FIG. 4. Illustrated cage 50 may comprise a plurality of annular straps 52 interconnected by straight strap portions 54 and interconnecting curved strap portions 56 disposed adjacent the juncture of the horizontal main branch of the fitting and the transversely disposed shorter stem portion thereof. The annular straps 52 may be straight straps bent to fit about the fitting peripheral portions and welded in place or integral rings slipped in place, all of the straps or rings employed are preferably of high tensile steel.

It will be seen from FIG. 2 that the flange portions 12 of the mandrel forms 10 define at their opposed inner surfaces the end limits of the fitting which is formed. Accordingly, such flanges assist in the formation of the fitting by defining exactly the length of the main transverse arm or branch formed about the mandrel portion 36h and, in addition, flange portion 12a disposed on the mandrel portion 14a serves to define exactly the length of the stem portion of the fitting which is formed.

It should be noted that in the course of welding the straps about the exterior periphery of initial shell 49f illustrated in FIG. 4, care is taken to assure that the straps are disposed as closely as possible to the underlying shell surface. The closeness of the fit between the cage 50 and the underlying shell is apparent from FIG. 4 in which the straight strap portions 54 are seen to hug the surface of the stem portion of the smooth, initially formed shell 49f.

Following formation of the cage 50 about the periphery of the shell 49f the shell is again cleaned with an organic solvent such as acetone to assure a clean and dirt-free condition. The surface of the shell 49 is similarly cleaned prior to formation of the cage and following the grinding formation to remove any dust which may have formed, insuring integral formation with the resin and glass to be applied.

The resulting shell and cage assembly which has been cleaned free of dirt then has applied thereto a thickened, hardenable epoxy resin composition which by way of example may comprise one hundred parts of epoxy resin, twelve parts based on the weight of the resin of a hardener (triethylenetetramine), thirty parts per hundred parts by weight of the resin of silica powder (200 mesh), and two parts per hundred parts by weight of the resin of a thixotropic agent such as that sold under the trade name of Cab-O-Sil. The thickened paste is applied to the interstices between the straps of the metal cage 50 so as to form a substantially smooth, even, outer surface as indicated by the lefthand portion of FIG. 4 illustrative of the appearance of the shell and cage member after such a thickened composition has been applied. Such thickened composition is forced between the elements of the cage and the underlying shell so as to assure the elimination of all air entrapment and voids such as might give rise to points of weakness when the final fitting is subjected to forces and strains in the normal course of use.

After the thickened epoxy coating has been applied to the entire outer periphery of the assembly of FIG. 4, alternate layers of resin-saturated, horizontal socks and spiral roving are applied in the manner above described with respect to the formation of the shell 49f. FIG. 5 is illustrative of the continuation of the formation of the fitting body outer shell over the inner shell 49f as well as the overlying reinforcing metal cage 50. It will be seen from FIG. 5 that the longitudinal socks 38 and spiral roving layers 40 are once more applied until a final fitting body of desired final dimensions has been manufactured.

In FIG. 5 the main branch of the illustrated fitting has already had formed thereover a longitudinal sock 38 and a transverse roving layer 40. FIG. 5 also illustrates the stem portion of the partially formed T in the course of having a spiral roving layer 60 formed thereabout after a longitudinal arrangement of filaments 62 has been placed about the periphery of the fitting stem portion and tied down on rod 24. It will be noted that the applied roving forming the spiral filaments 60 also pass through the epoxy resin-hardener bath in container 46 being guided in the passage therethrough by means of the guide elements 44. The illustrated fitting, in the course of having the spiral windings 60 disposed thereon, is rotated about tie rod 24 which is shown in engagement with drive chuck 48.

It should be appreciated that the applied roving spirals 60 may be guided over the fitting stem portion 36s by means of a hand guide which an operator may manipulate after the saturated roving leaves the bath 46 or the bath 46 may be disposed on a movable mount, not illustrated, to travel along the length of the fitting stem portion 36s in the course of rotation thereof.

The roving is similarly guided in the course of traveling along the length of the main horizontal branch 36h of the fitting mandrel when the assembly is rotated by means of chuck 48 in the manner illustrated in FIG. 2.

Following completion of the fitting formation, the longitudinal roving socks are cut by means of a knife at the interface between the main horizontal branch of the fitting and the opposed flanges 12. Similarly, the socks are cut at the interface between flange 12a of form 10a and the end of the stem portion of the final fitting product. The locking nuts 30 are then loosened to permit removal of the tie rod 25 and the opposed pressure plates 28 from engagement with the main horizontal arm of the completed fitting member and the tie rod 24 is unscrewed from engagement with the tapped aperture 18 of the tubular mandrel member 16 so that mandrel elements 26, 27 and 24 may be removed from the final product. The final fitting is then subjected to a heat cure in a curing oven until the desired hardness of the final product has been reached.

By way of specific example, an initial glass-reinforced epoxy resin shell may be formed having a body thickness of approximately three-eighths inch after which the metal cage 50 of FIG. 4 is welded thereover, the welded straps having a thickness of approximately ¼ inch. The curing temperature for the initial shell 49 may be in a temperature range of approximately 80° F to 250° F as may be the curing temperature of the final fitting product. The fitting 70 of FIG. 10 is illustrative of the final product. Each end limit of the three arms of the final fitting 70 has disposed therein female threads 71 formed by the mandrel portions 14 and 14a. If it is desired to form male threads on the end of a fitting member, the fitting arm on which the threads are desired may be centered in a male thread mold such as mold 72 illustrated in FIG. 9 wherein an arm 74 is illustrated in phantom lines. After being centered within the male thread mold 72, having female threads 77 disposed therein about the inner periphery thereof, the fitting arm may have packed about the outer periphery thereof and between said periphery and the adjacent female threads 76 a thickened epoxy resin composition similar to the paste above described for purposes of filling in the outer periphery of the initial fitting shell after the metal cage has been welded thereover. It is, of course, preferred that the periphery of the fitting arm 74 be ground by means of an abrasive disc or the like to facilitate and increase the bond of the epoxy thread-forming composition. Following hardening of the resin, the mold 72 is unscrewed and the threads subjected to desired additional curing.

FIG. 6 comprises an exploded view illustrating elements which may be employed for purposes of forming a ninety-degree fitting elbow. It will be noted that the elements comprise opposed female thread mold forms 76 having male threads 78 formed thereon so that corresponding female threads may be formed in the final fitting product. Interposed the elements 76 are intermediate tubular portions 80 having beveled edges 82 which engage complementary beveled edges 84 of a central keystone tubular portion 86. Because of the 90° bend in the elements in the normal course of assembly, a chain member 88 secured at opposed ends to anchor bolts 90 locked to flange portions 92 by means of nuts 94 is employed for purposes of effecting the desired assembly tension between the various elements illustrated. End tubular portion 96 interposed the flanges 98 defining the end limits of the elbow to be formed and the flange portions 92 facilitate the handling of the assembly mandrel elements. In the normal state of assembly, the unitary mandrel may be rotated about either end limit of the anchor bolts 90 which are threaded at 100 for purposes of engaging a rotating supporting chuck member similar to member 48 illustrated in FIGS. 2 and 5.

The assembled mandrel is then coated with a parting layer such as paraffin wax whereafter the desired initial shell of alternate layers of resin-saturated longitudinal socks and transverse spirals is built up in the manner previously described, whereafter reinforcing metal cage 104 is welded about an intially formed shell member 106. The latter shell is appropriately surface prepared to facilitate bonding with the outer resin shell. Following welding of the cage 104 about the shell 106, the resulting assembly is cleaned in the manner above described, whereafter a final shell is formed over the assembly of FIG. 7 to define a finished elbow construction. FIG. 8 illustrates the close, relative disposition between the cage 104 and the surface of the shell 106.

The cage reinforcement provided in accordance with the teachings of this invention enables the burst strength of the provided fittings to be increased as much as 100% and more. By forming the final outer shell integral with the inner shell and interposed cage member, a unitary rigid body free from relative movement between the various elements thereof is assured, providing a desired characteristic particularly where vibrational forces are exerted upon the fitting in the normal course of use.

Although as above pointed out, it is preferred that in the normal course of forming the main tubular body portions of the fittings, the initial layers of the glass roving be longitudinal, in the formation of the threaded portions of the fittings above described, it is preferred that the initial roving layer applied over the male threads comprising the female thread forms be spiral so as to improve the hoop strength of the resulting threads. By virtue of the close proximity of the resulting female threads formed on the fittings described to adjacent reinforcing steel strap members, the shear strength of such threads is greatly improved and an additional reinforcing function of the reinforcing cage is readily seen.

It is believed apparent from the foregoing description that a number of modifications may be effected in the apparatus and method described which still remain within the ambit of the invention. For example, although the foregoing description has utilized an epoxy resin as the preferred resin for use in the formation of the body of the fittings described, it is apparent that other suitable thermosetting resins may be satisfactory for the purposes of carrying out this invention. Furthermore, although the described fitting members have formed integrally therewith male and female threads on arm portions thereof, the basic fitting construction above described may, of course, be employed with fittings employing bell ends having fluid sealing gaskets located in grooves thereof for purposes of effecting fluid-tight seals with conduit members telescopically or abuttingly engaged therewith.

The various separable mandrel elements may be arranged in a state of assembly by virtue of an end-to-end abutting relationship. As a result of the pressure exerted against the elements, the positioning of such elements may be facilitated by the employment of a telescopic engagement between the members or a tongue and groove interfitting engagement or other well-known type of key between the discrete members to effect an interlock and assure a desired relationship in the final state of assembly as the fitting body is formed thereover in the normal course of fitting manufacture in the manner above described.

This application is to be limited, therefore, only by the scope of the appended claims.

I claim:

1. A method of forming corrosion-resistant fitting constructions having tubular conduit portions, comprising forming a first integral, seamless fitting body about a form from resin-saturated glass filaments arranged substantially transversely and parallel to the central axes of the fitting tubular portions; welding a plurality of spaced, annular metal reinforcement straps about each of said tubular conduit portions; welding the conduit reinforcement portions together with reinforcement connection means so as to form an integral, rigid, reinforcing metal case about said first fitting body; the elements of said metal cage being in snug engagement with the surface of said first fitting body; completing the formation of said fitting construction by application of additonal uncured resin and glass filament reinforcements until a fitting construction of desired dimensions is formed with said cage embedded within the thickness of said fitting construction and hidden from view whereby said fitting tubular portions are reinforced by said cage against axial and torsional forces said fitting construction being substantially free of interior voids, curing the additional uncured resin, and removing said form from the resulting fitting construction.

2. The method of claim 1 in which the completed fitting is cured for one-quarter to one-half hour at slightly above room temperature until said resin has initially set and then cured at a temperature within the range of between 200° F and 250° F.

3. The method of claim 1 in which said straps are formed of high tensile steel and the thickness of said straps is about 174 inch.

4. The method of claim 1 in which interstices between the first fitting body exterior and the metal cage, and the interstices between the metal straps are filled with a curable resin paste prior to the application of additional resin-saturated glass filaments about said cage for purposes of completing the formation of said fitting.

5. The method of claim 4 in which said resin paste comprises epoxy resin and hardener in admixture with silica powder.

6. The method of claim 1 in which the first fitting body is surface finished as by an abrasive disc to remove any sheen thereon whereby its bond to subsequently applied resin is facilitated.

7. A fitting construction comprising a hardened, resinous, corrosion-resistant body of seamless, unitary construction having tubular portions formed along intersecting axes; said tubular portions being reinforced by reinforcing filaments of high tensile strength arranged substantially transversely and parallel to the axes of said tubular portions; said filaments being embedded in a cured resin matrix, a unitary reinforcing cage formed of spaced, reinforcing metal straps arranged within the thickness of said tubular portions; said straps of said cage being in the form of annuluses arranged substantially transversely to the axis of the tubular portion in which disposed, and annulus-connecting strap portions connecting said annuluses whereby interstices are defined by said cage straps; said annuluses and connecting straps being joined by welding and comprising reinforcement for said fitting tubular portions against axial and torsional forces; hardened resinous material disposed in said interstices defined by said cage straps; said transverse and parallel filament reinforcements embedded in a resin matrix comprising layer portions disposed inwardly and outwardly of said cage; said layer portions being connected by said hardened resinous material disposed in said strap interstices; the thickness of said fitting construction being substantially void free.

8. The fitting construction of claim 7 in which female threads are formed about the inner periphery of the distal end portion of at least one tubular portion of said fitting, said threads being disposed adjacent an embedded portion of said rigid cage whereby the resistance of said threads to shear forces is greatly enhanced.

9. The fitting construction of claim 7 in which threads of hardened resin are molded on at least one end portion of a tubular portion of said fitting adjacent a portion of said reinforcing cage whereby the shear strength of said threads is assisted by the anchoring function of the adjacent cage portion.

10. A method for reinforcing a corrosion-resistant, filament-reinforced, resin fitting formed about a form defining the inner surface portions of such fitting, comprising forming a unitary seamless shell of filament reinforcements of high tensile strength about said form arranged substantially parallel and transversely to the central axis of the fitting portion of which forming a part; applying uncured hardenable resin to said filaments whereby they are embedded in a resin matrix; curing said resin matrix to form said seamless shell; forming a reinforcing cage about and in snug engagement with said seamless shell from welded metal straps; said cage being in the form of annuluses arranged substantially transversely to the tubular portion about which disposed, and annulus-connecting strap portions connecting said annuluses whereby cage interstices are formed between said straps; applying hardenable resinous material in said case interstices and between said shell and said cage whereby a substantially void-free body results; applying overlying layers of resin-saturated filaments of high tensile strength arranged parallel and transversely to the central axis of the fitting portion of which comprising a part until a fitting of desired thickness is formed with said filaments disposed in an outer uncured resin matrix; curing the outer uncured resin matrix to define a substantially void-free, cured, resin body having reinforcing filaments and a reinforcing cage disposed therein; and removing said fitting form from the resulting reinforced resin fitting.

* * * * *